(12) United States Patent
Cappelletti

(10) Patent No.: US 11,899,105 B2
(45) Date of Patent: Feb. 13, 2024

(54) MONITORING METHOD AND SYSTEM TO MONITOR THE UNDERWATER TRAFFIC OF AN AREA OF INTEREST

(71) Applicant: Sergio Cappelletti, Leghorn (IT)

(72) Inventor: Sergio Cappelletti, Leghorn (IT)

( * ) Notice: Subject to any disclaimer, the term of this patent is extended or adjusted under 35 U.S.C. 154(b) by 0 days.

(21) Appl. No.: 17/796,831

(22) PCT Filed: Feb. 3, 2021

(86) PCT No.: PCT/IB2021/050871
§ 371 (c)(1),
(2) Date: Aug. 1, 2022

(87) PCT Pub. No.: WO2021/156765
PCT Pub. Date: Aug. 12, 2021

(65) Prior Publication Data
US 2022/0390600 A1    Dec. 8, 2022

(30) Foreign Application Priority Data

Feb. 3, 2020    (IT) .................... 102020000002047

(51) Int. Cl.
*G01S 15/89*    (2006.01)
*B63C 7/26*    (2006.01)
(Continued)

(52) U.S. Cl.
CPC ............... *G01S 15/89* (2013.01); *B63C 7/26* (2013.01); *G01S 7/56* (2013.01); *G01S 15/04* (2013.01)

(58) Field of Classification Search
CPC .......... G01S 15/04; G01S 7/006; G01S 15/89; G01S 7/56; B63C 7/26
See application file for complete search history.

(56) References Cited

U.S. PATENT DOCUMENTS 10,000,263 B2 *    6/2018    Farber ................... B63G 8/001
10,502,828 B2 *    12/2019    Kronander ............. G01S 7/006
(Continued)

FOREIGN PATENT DOCUMENTS

DE    102013104306    10/2014
WO    2017076681    5/2017

OTHER PUBLICATIONS

International Search Report and Written Opinion issued in connection with International Application No. PCT/IB2021/050871 and dated Jun. 2, 2021 (13 pages).

*Primary Examiner* — John A Tweel, Jr.
(74) *Attorney, Agent, or Firm* — KLINTWORTH & ROZENBLAT IP LLP

(57) ABSTRACT

Monitoring method and system to monitor the underwater traffic of an area of interest where at least one underwater element is going to operate. The system comprises: a memory, which is configured to store data comprising a representation of the area of interest, and a list of a plurality of types of underwater elements with the relative digital model; a detection unit to detect the position and the orientation of each underwater element present inside said area of interest; a processing unit, which is configured to determine, based on the stored data and on the detection of said detection unit, the type of each underwater element present inside the area of interest, and to generate, based on said data, a representation of the area of interest showing the static obstacles, and the digital model, the position and the orientation of each underwater element present inside said area of interest; and a user interface to display said representation of the area of interest.

15 Claims, 2 Drawing Sheets

(51) Int. Cl.
  *G01S 7/56* (2006.01)
  *G01S 15/04* (2006.01)

(56) References Cited

U.S. PATENT DOCUMENTS

| | | |
|---|---|---|
| 11,280,905 B2 * | 3/2022 | Donly .................... B63G 8/001 |
| 11,681,041 B2 * | 6/2023 | Brink ................... G05D 1/0692 |
| | | 441/21 |
| 2015/0078123 A1 | 3/2015 | Batcheller |
| 2015/0192488 A1 * | 7/2015 | Xu ......................... B63G 8/001 |
| | | 348/81 |
| 2016/0266246 A1 * | 9/2016 | Hjelmstad ............... G01S 15/86 |
| 2022/0363357 A1 * | 11/2022 | Strunk ................. G05D 1/0044 |

* cited by examiner

MONITORING METHOD AND SYSTEM TO MONITOR THE UNDERWATER TRAFFIC OF AN AREA OF INTEREST

CROSS-REFERENCE TO RELATED APPLICATIONS

This patent application claims priority from Italian patent application no. 102020000002047 filed on Mar. 2, 2020, the entire disclosure of which is incorporated herein by reference.

TECHNICAL FIELD

The present invention relates to a monitoring system and to a monitoring method for monitoring the underwater traffic of an area of interest, where at least one underwater element is going to operate.

BACKGROUND OF THE INVENTION

The system and the method of the invention are particularly suitable to be used for the execution of underwater operations, during which one or more underwater elements are released into the sea, for example salvage operations of damaged submersibles, or work activities in submerged construction sites, etc.

Generally, in these cases, a plurality of underwater elements, each one programmed for performing a certain action, is released into the sea by a maritime vehicle, for example a release platform or a ship, which remains stationary at the area where such underwater operations will have to be carried out. Typically, the majority of such underwater elements remain secured to the maritime vehicle which releases them, by means of a series of cables. It is understood that this type of underwater operations requires an accurate programming step, during which the area of interest, i.e. the area where such underwater operations will be carried out, is studied so as to identify the morphology of the seabed, the position and the size of all possible static obstacles present in the area so as to be able to programme in detail both the release of the various underwater elements (i.e. when and from which position the underwater elements are to be released) and the operations and the paths that said underwater elements will have to perform once released inside the area of interest. Furthermore, it is understood that also during the performing of the operations it is necessary to verify and control that the operations are performed as programmed and that each underwater element accomplishes the operations for which it has been designed.

To date, such programming step of the operations and the verification and control steps thereof are performed making use of the topographic maps provided by the Geographic Information System (G.I.S.), with regard to the analysis of the morphology of the seabed, and, when present, of the data obtainable from the localization systems of each underwater element, for example the so-called stand-alone control systems, each one independent of one another, which provide a representation of the movements executed by the relative underwater element.

However, with this methodology during the verification and control step it is necessary for one or more specialised operators to monitor simultaneously a plurality of representations, each one concerning a specific underwater element, furthermore the operators have to simultaneously have at disposal, in paper format or in another interface, a representation of the seabed of the area where the underwater elements will be operating and a representation of the fixed obstacles present inside such area. Then, the operators have to calculate, based on all these representations, the reciprocal position of the various underwater elements so as to verify that they interact with one another and with the static and/or possibly dynamic obstacles present in the area of interest in the most suitable manner. Such verifications should be repeated continuously upon the variation of the position of at least one of the underwater elements operating in the area of interest. It is understood that this requires the presence of highly qualified personnel, and that in any case the carrying out of such verifications has a high likelihood of error.

Furthermore, in order to perform such verifications, to date it is necessary to have on board the maritime vehicle adapted to release the underwater elements a plurality of interfaces, with a consequent increase in costs and in dimensions.

Additionally, the above-described verifications should be executed keeping into account the presence of the cables by means of which the underwater elements are secured to the maritime vehicle that releases them, so as to prevent the risk that such cables interweave between one another during the execution of the operations. However, the localization systems on board the underwater elements do not provide any information with regard to the position of such cables, making their monitoring in actual fact impossible.

The object of the present invention is to provide a monitoring system and a monitoring method for monitoring the underwater traffic of an area of interest where at least one underwater element is going to operate; said monitoring system and monitoring method being exempt from the above-described drawbacks and, at the same time, being easy and cost-effective to implement.

SUMMARY

In accordance with the present invention, a monitoring system and a monitoring method to monitor the underwater traffic of an area of interest, where at least one underwater element is going to operate, are provided according to what set forth in the independent appended claims, and preferably, in any one of the claims directly or indirectly dependent on the mentioned independent claims.

The claims describe preferred embodiments of the present invention forming integral part of the present description.

BRIEF DESCRIPTION OF THE DRAWINGS

The present invention will now be described with reference to the accompanying drawings, which illustrate a non-limiting embodiment example thereof, wherein.

DETAILED DESCRIPTION

Figure 1:
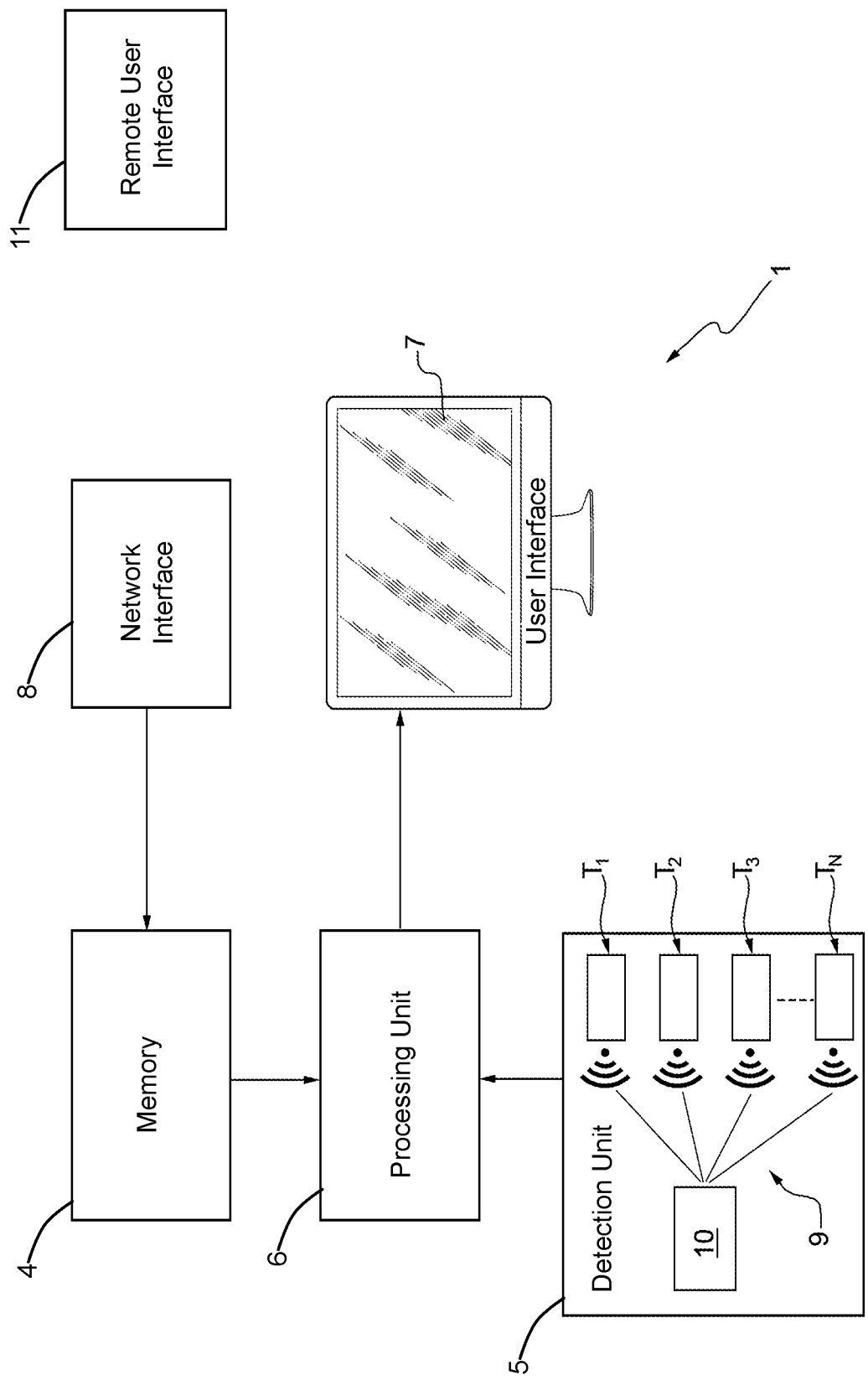
FIG. 1 illustrates a schematic representation of the monitoring system in accordance with an embodiment of the present invention.

In the accompanying figures, reference numeral 1 generally indicates, as a whole, a monitoring system for monitoring the underwater traffic of an area of interest 2 where at least one underwater element Ai is going to operate. In particular, the expression "area of interest 2" within the present description will refer to the underwater area where one or more underwater elements Ai are going to operate, i.e. to the area where a certain underwater operation is performed. The underwater operation can be, for example, a salvage operation of a damaged submarine or submersible; a salvage operation of people or objects; a work activity in subsea construction sites; an installation and/or monitoring and repair operation of cables and/or subsea pipelines; a monitoring and/or repair operation of subsea extraction wells; an inspection and/or scanning of an underwater area of interest; a drill for underwater rescue operations, a military drill, for example for military operations releasing special troops, etc.

Furthermore, in the present description, the expression "underwater element" refers to any object or person fit to carry out underwater operations, such as for example underwater machine tools, remotely operated underwater vehicles, autonomous underwater vehicles, atmospheric diving suits, saturation divers, diving bells, manned (i.e. with human crew) rescue vehicles, underwater transporters, underwater troops, etc.

Figure 2:
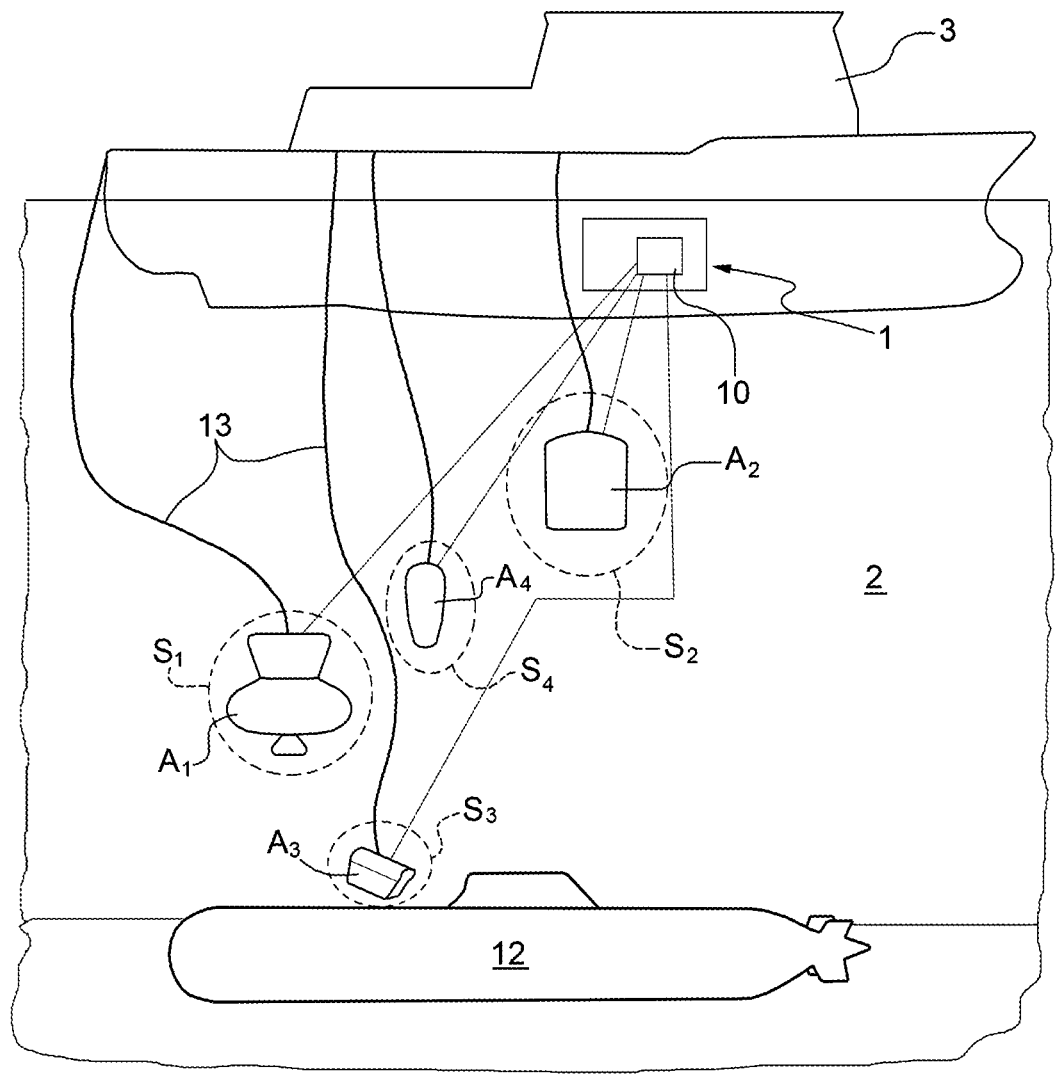
FIG. 2 illustrates a schematic representation of a maritime vehicle which carries the monitoring system of FIG. 1, of a plurality of underwater elements and of a damaged submarine during a rescue operation of a damaged submarine.

According to some advantageous embodiments such as the one illustrated in FIG. 2, the monitoring system 1 is configured to be installed on a maritime vehicle 3, for example on a release platform or on a mother ship, which is typically stationary at said area of interest 2, at least for a time sufficient for allowing the release into the sea of one or more underwater elements $A_i$, which typically for this exact reason are defined collaborating elements, i.e. they collaborate with the maritime vehicle 3 that releases them.

Specifically, the monitoring system 1 of the invention comprises a memory 4 configured to store data, a detection unit 5 to continuously detect the position and the orientation of each underwater element $A_i$ present inside the area of interest 2 and a processing unit 6.

In detail, according to some advantageous but non-limiting embodiments, the data stored in the memory 4 comprise a representation, preferably but not necessarily three-dimensional, of the area of interest 2 and a list, i.e. a library, comprising a plurality of types of underwater elements $A_i$ and a digital model, i.e. a graphic representation, preferably but not necessarily three-dimensional, for each one of said underwater elements $A_i$.

Advantageously, the processing unit 6 is configured to determine, based on the detection of the detection unit 5 and on the data contained in the memory 4, the type of each underwater element $A_i$ present inside the area of interest 2; and to generate, always based on the detection of the detection unit 5 and on the data contained in the memory 4, a representation, preferably but not necessarily three-dimensional, of the area of interest 2 showing in real time the static obstacles, and the model, the position and the orientation of each underwater element $A_i$ present inside said area of interest 2. The monitoring system 1 further comprises a user interface 7, for example a screen, or a touch screen, a multi-touch screen, a holographic representation, a representation by means of an augmented reality support, a virtual reality support etc., configured to display said representation of the area of interest 2.

In detail, advantageously but not necessarily, the representation of the area of interest 2 stored inside the memory 4 shows the morphology of the seabed at (i.e. along the entire extension) the area of interest 2 and at least the static obstacles (such as for example damaged vehicles, objects lost at sea, subsea works, etc.) present inside such area of interest 2.

Such representation is generally provided by the Geographic Information System (G.I.S.).

According to some advantageous but not exclusive embodiments such as the one illustrated in FIG. 1, the monitoring system 1 also comprises a network interface 8 configured to receive such representation of the area of interest 2 from the Geographic Information System (G.I.S.) and transfer it into memory 4.

According to some advantageous but non-limiting embodiments, the processing unit 6 is also configured to control, based on said data and on the detection of said detection unit 5, the movements of each underwater element $A_i$ operating in said area of interest 2.

According to some advantageous but non-limiting embodiments, the digital model stored in the memory 4 associates each underwater element $A_i$ with a safety area $S_i$ which contains the underwater element $A_i$ and extends up to a defined distance from the underwater element $A_i$. In this case, the processing unit 6 is advantageously configured to generate, based on the data stored in memory 4 (in particular, based on the safety area $S_i$ of each underwater element $A_i$) and on the detection carried out during said detection step, an alarm signal when a safety area $S_i$ of an underwater element $A_i$ present inside the area of interest 2 is at least partially invaded, in particular by a static obstacle or by another safety area $S_{i+a}$ of another underwater element $Ai_{+a}$.

In particular, advantageously but not necessarily, such alarm system is a visual signal, for example a light displayable inside the representation displayed in the user interface 7. Additionally or alternatively, the alarm signal is a sound signal.

According to further advantageous but non-limiting embodiments, the data contained in the memory 4 comprise a programming of the action, which associates each underwater element $A_i$ of the list stored in the memory 4 which is going to operate inside the area of interest 2 with a destination position, preferably a path to accomplish up to such destination position. In this case, the processing unit 6 is configured to determine, based on such programming, the likelihood of the safety area $S_i$ of each underwater element $A_i$ operating in the area of interest 2 being at least partially invaded.

In other words, the processing unit 6 is configured to entail, based on the programming, more in particular based on the destination position of each underwater element $A_i$, a trajectory for each underwater element $A_i$ and based on such trajectory evaluate the likelihood of interference, i.e. the likelihood of the safety area $S_i$ of each underwater element $A_i$ being invaded (i.e. crossed by a static or dynamic obstacle, in particular by a static obstacle or by another safety area $S_{i+a}$ of another underwater element $Ai_{+a}$). It has been observed that such assessment is even more realistic when made also in the light of the dynamic characteristics of each underwater element $A_i$, i.e. based on the laws of motion that govern the movement of each element inside the area of interest 2. For this exact reason, according to some advantageous but non-limiting variants, the data stored in the memory 4 (and more in particular the list of the types of underwater elements $A_i$) also comprise a dynamic characterization of each type of underwater element $A_i$, said dynamic characterization associating each underwater element $A_i$ with a given dynamic behaviour (i.e. certain equations of motion).

Advantageously but not necessarily, when the processing unit 6 is configured to determine such likelihood of the safety area $S_i$ of each underwater element $A_i$ operating in the area of interest 2 being at least partially invaded, the processing unit 6 is further configured to control, based on the programming of the action, on the safety area $S_i$ of each underwater element $A_i$ and on the detection of the detection unit 5, the movements of each underwater element $A_i$ operating in said area of interest 2.

In other words, in this case it is possible to entail an automatic movement of each underwater element $A_i$ operating in said area of interest 2, by programming the processing unit 6 so as to stop or move an underwater element $A_i$ in an established manner when the safety area $S_i$ of such underwater element $A_i$ is invaded (or is on the point of being invaded).

According to some advantageous but non-limiting embodiments, the model of each type of underwater element $A_i$ stored in the memory 4 contains a graphic representation also of the possible cables 13 by means of which each one of said underwater elements $A_i$ is going to be released by the maritime vehicle 3. This advantageously allows monitoring also the reciprocal position of the cables 13 present inside the area of interest 2, preventing the risk that said cables interweave with one another.

In accordance with some advantageous but not exclusive embodiments such as the one schematically illustrated in FIGS. 1 and 2, the detection unit 5 comprises a sound-based localization system 9.

Advantageously but not necessarily, the localization system 9 comprises a receiver and transmitter unit 10, for example an antenna, placed in an established position (in particular, in a fixed position), and at least one receiver and transmitter unit Ti, for example a transponder, for each underwater element $A_i$ which is going to operate inside the area of interest 2.

In detail, advantageously, each receiver and transmitter unit Ti is fixed, i.e. integral, to each underwater element $A_i$ which is going to operate inside the area of interest 2 and is configured to emit sound signals. The receiver and transmitter unit 10 is configured to interrogate and/or receive the sound signals emitted by the receiver and transmitter units Ti present inside the area of interest 2 and to determine the position of each underwater element $A_i$. In particular, the receiver and transmitter unit is configured to interrogate and/or receive the sound signals emitted by the receiver and transmitter units Ti present inside said area of interest 2 and to determine, for each sound signal received, the position of signal generation. In other words, measuring the time elapsed between the sending of each sound signal from a receiver and transmitter unit Ti and the receipt of said signal by the receiver and transmitter unit 10 determines the distance of the given receiver and transmitter unit Ti that emitted the signal from the receiver and transmitter unit 10, therefore knowing the position, with respect to the area of interest 2, of the receiver and transmitter unit 10 (which is fixed) it evaluates (in real time) the position of each underwater element $A_i$.

According to other advantageous but non-limiting embodiments, the processing unit 6 is in communication with the receiver and transmitter unit 10 and is configured to determine, based on what is received from the receiver and transmitter unit 10 and on the data stored in the memory 4, the orientation of each underwater element $A_i$ present inside the area of interest 2. In detail, advantageously but not limitingly, each receiver and transmitter unit $T_i$ is placed on each underwater element $A_i$ in a defined position, in particular with respect to the centre of mass of the underwater element $A_i$, advantageously the processing unit 6 will be able to determine the orientation of each underwater element $A_i$, based on the position of such receiver and transmitter unit $T_i$ and based on the model of each underwater element $A_i$ (in particular making the position of the receiver and transmitter unit $T_i$ coincide with the position of the centre of mass of the model of the underwater element $A_i$ and applying a roto-translation of the position of the receiver and transmitter unit $T_i$ with respect to the centre of mass).

Advantageously but not necessarily, the receiver and transmitter unit 10 is placed on board the maritime vehicle 3 in a fixed position, i.e. established, more in particular known.

In accordance with further non-limiting embodiments of the invention, the processing unit 6 is configured to communicate with each underwater element $A_i$. Advantageously but not necessarily, the communication between the processing unit 6 and each underwater element $A_i$ is a bidirectional communication. Even more advantageously, the processing unit 6 is configured to transmit commands and/or sound signals to each underwater element $A_i$.

According to further advantageous but non-limiting embodiments such as the one illustrated in FIG. 1, the monitoring system 1 comprises a further user interface 11 placed in a remote location, i.e. distant with respect to the remaining monitoring system 1 and/or to the area of interest 2 for example on the dry land or on a further naval/air/land vehicle supporting the underwater operation which is going to be carried out inside the area of interest 2, and configured to display said representation of the area of interest 2. Advantageously but not necessarily, when present, such further user interface 11 is in communication with the processing unit 6 and with the user interface 7 so that the further user interface 11 displays the same representation of the area of interest 2 displayed by the user interface 7. This advantageously allows also a remote control of the operations which are carried out inside said area of interest 2.

According to other advantageous but non-limiting embodiments not illustrated, the monitoring system 1 comprises a plurality of network interfaces so as to receive also information concerning possible dynamic obstacles present inside the area of interest 2, in other words such further network interfaces can receive information from the autonomous control system of one or more maritime vehicles present in the water and can transfer said information into memory 4 and integrate it with the data already stored inside the memory 4.

According to some advantageous but non-limiting embodiments, the user interface 7 is configured to allow the insertion into memory 4 of further types of underwater elements $A_i$, allowing in this manner the integration of the list of the types of underwater elements $A_i$ stored in memory 4.

Furthermore, according to other advantageous but non-limiting variants, the user interface 7 is configured to allow the access to the monitoring system 1 (i.e. to the memory 4 and/or to the processing unit 6) by means of an identification mechanism of user name/password type. Furthermore, when provided, such identification mechanism of user name/password type can be configured to allow a selective access to the monitoring system 1 to the different users having a different user name, in this way it will be possible to give the different users, for example depending on their level of competence and/or on their role, the possibility to carry out certain actions instead of another; for example by accessing the monitoring system 1 with some user names it will be possible to insert new data, with others it will also be possible to communicate with one or more underwater elements etc.

In accordance with a second aspect of the present invention, a monitoring method is provided for monitoring the underwater traffic of an area of interest 2, where at least one underwater element $A_i$ is going to operate.

In detail such method, advantageously but not necessarily, can be implemented by using the above-described monitoring system 1.

The monitoring method of the invention comprises an acquisition step, during which data are acquired and stored which comprise a representation, preferably but not necessarily three-dimensional, of the area of interest 2 which shows at least the static obstacles present inside such area of interest 2 and a list of a plurality of types of underwater elements $A_i$, said list associating a digital model, preferably but not necessarily three-dimensional, with each one of the underwater elements $A_i$. The considerations relating to the data stored in the memory 4 presented above with reference to the monitoring system 1 are valid also for the monitoring method.

The monitoring method further comprises a detection step, during which the position and the orientation of each underwater element $A_i$ present inside the area of interest 2 are continuously detected; and a processing step, during which, based on the data acquired and stored during the acquisition step and on the detection carried out during the detection step, the type of each underwater element $A_i$ present inside the area of interest 2 is identified and a representation, preferably but not necessarily three-dimensional, of the area of interest 2 is generated which shows in real time the static obstacles, the digital model, the position and the orientation of each underwater element $A_i$ present inside the area of interest 2.

The method of the invention advantageously also entails a displaying step during which the three-dimensional representation of the area of interest 2 is displayed in a user interface 7.

Advantageously but not limitingly, the detection step is at least partially simultaneous with the processing step; even more advantageously, the detection step is simultaneous with the processing step and with the displaying step so that the data obtained from said detection step are available in real time in the above-described representation of the area of interest 2 which is displayed during the displaying step.

According to an advantageous but non-limiting embodiment, the data acquired and stored during the acquisition step comprise, for each underwater element $A_i$, a safety area $S_i$ which contains the underwater element $A_i$ and extends up to a defined distance from the respective underwater element $A_i$. In this case, advantageously but not necessarily, the processing step entails, based on the detection carried out during the detection step and on the data acquired and stored during the acquisition step (in particular based on the safety area $S_i$ of each underwater element $A_i$), the generation of an alarm signal when a safety area $S_i$ is at least partially invaded.

Advantageously but not necessarily, the detection step is carried out with a sound-based localization unit 9, for example such as the one described above.

According to other advantageous but non-limiting variants of the present invention, the acquisition step entails the acquisition and the storing of a programming of the action for each underwater element $A_i$, said programming associating each underwater element $A_i$ that is going to operate inside the area of interest 2 with a destination position (more advantageously a path to be accomplished inside the area of interest 2 so as to carry out a certain action, and thus so as to reach said destination position). In this case, advantageously, the processing step entails, based on the detection carried out during the detection step and on the data acquired and stored during the acquisition step, the determination of the likelihood of the safety area $S_i$ of each underwater element $A_i$ that operates in said area of interest 2 being at least partially invaded.

As already explained with reference to the monitoring system 1, in this case, during the processing step a trajectory is entailed for each underwater element $A_i$ and based on such entailed trajectory the so-called likelihood of interference is evaluated, i.e. the likelihood of the safety area $S_i$ of each underwater element $A_i$ being invaded (i.e. crossed by a static or dynamic obstacle, in particular by a static obstacle or by another safety area $S_{i+a}$ of another underwater element $Ai_{+a}$).

According to some advantageous but non-limiting variants of the method of the invention, in order to allow a better assessment of such likelihood, the method entails that during the acquisition step also a dynamic characterization of each type of underwater element $A_i$ that associates each underwater element $A_i$ with a given dynamic behaviour (i.e. certain equations of motion) is acquired and stored.

Advantageously but not necessarily, the method also comprises a control step wherein each underwater element $A_i$ present inside the area of interest 2 is controlled, based on the data acquired and stored during the acquisition step (preferably but not necessarily based on the programming of the action and on the safety area $S_i$ of each underwater element $A_i$) and on the detection carried out during the detection step.

Further characteristics of the present invention will result from the following merely illustrative and non-limiting description of a possible use of the monitoring system and of the monitoring method of the invention.

In detail, the monitoring method and the monitoring system 1 of the present invention can be used for example for monitoring the rescue operations of a damaged submarine on the bottom of the sea. In this specific scenario schematically illustrated in FIG. 2, the monitoring system 1 is mounted on board the maritime vehicle 3, which in this case is a rescue ship that has to salvage the crew of the damaged submarine.

Furthermore, in this case, inside the area of interest 2 a plurality of, in particular four, different underwater elements $A_i$ operate and the detection unit 5 entails a localization unit 9 of the type described above which has a receiver and transmitter unit 10 placed on board the rescue ship 3, and a receiver and transmitter unit, in the specific case a transponder, $T_1$, $T_2$, $T_3$ and $T_4$ for each underwater element $A_1$, $A_2$, $A_3$ and $A_4$.

In particular, in the non-limiting example illustrated in FIG. 2 such elements are: a deep-sea diving bell $A_1$ used for the employment of divers; an escape pod $A_2$, or alternatively with a deep-sea rescue vehicle, adapted to couple directly to the damaged submarine 12 so as to allow the extraction of the submarine crew; a remotely operated vehicle A3; a subsea ventilation system A4. It is understood that such rescue operation of the damaged submarine 12 on the bottom of the sea could be performed with any number of (in particular with at least one of the) underwater elements $A_1$ described above, or with any other underwater element $A_i$ suitable to carry out one or more steps of such rescue operation.

As illustrated in FIG. 2, such underwater elements $A_1$, $A_2$, $A_3$ and $A_4$ are all connected to the rescue ship 3 by means of cables 13, hence the advantage of having a displaying in real time of the reciprocal position of the different underwater elements $A_1$, $A_2$, $A_3$ and $A_4$ with respect to one another and with respect to the submarine 12 is apparent.

The main advantage of the above-described monitoring method and monitoring system 1 is connected to the fact that said monitoring method and monitoring system 1 provide one single displaying, i.e. in one single user interface 7, one single representation containing the morphology of the seabed at the area of interest 2, the static obstacles and possible dynamic obstacles, and the model (thus a graphic representation), the position and the orientation instant by instant of all the underwater elements $A_i$ present in said area of interest 2, allowing a quick and easy displaying of their relative position and of their interaction. In other words, the monitoring method and monitoring system 1 of the invention provide continuously and in real time a complete and detailed overview of what happens inside the area of interest 2 in one single representation, in this manner simplifying the execution of the verification and control steps to be carried out during the underwater operations and the number of components (in particular of user interfaces) and of operators necessary for the monitoring (and possibly for the control) of a given underwater operation, increasing at the same time the level of safety thereof which is monitored (and possibly controlled) with greater precision.

The monitoring method and monitoring system 1 of the invention also represent an excellent tool for the planning step of the underwater operations, in fact providing in one single representation the representation of the area of interest 2 (and thus of the seabed) and of all the static and dynamic obstacles present in such area of interest 2 allows a more accurate planning of the underwater operation.

The monitoring method and monitoring system 1 of the invention are thus advantageously a useful support tool for each operator who deals with programming a given underwater operation inside an area of interest 2 and/or controlling and programming each underwater element $A_i$, and/or monitoring the operation.

The invention claimed is:

1. A monitoring system to monitor the underwater traffic of an area of interest where at least one underwater element is going to operate; said monitoring system comprises:
    a memory, which is configured to store data comprising at least one representation of said area of interest, which shows at least the static obstacles present inside said area of interest, and a list of a plurality of types of underwater elements, said list comprising a digital model for each one of said underwater elements;
    a detection unit to detect the position and the orientation of each underwater element present inside said area of interest;
    a processing unit, which is configured to determine, based on the detection of said detection unit and on the data contained in said memory, the type of each underwater element present inside the area of interest; and to generate, based on the detection of said detection unit and on the data contained in said memory, a representation of the area of interest showing the static obstacles, and the digital model, the position and the orientation of each underwater element present inside said area of interest; and
    a user interface, which is configured to display said representation of the area of interest.

2. A monitoring system according to claim 1, wherein: said digital model of said list associates each underwater element of said list with a safety area, which contains the underwater element and extends up to a defined distance from said underwater element; and said processing unit is configured to generate, based on said data and on the detection of said detection unit, an alarm signal when a safety area of an underwater element present inside said area of interest is at least partially invaded.

3. A monitoring system according to claim 2, wherein: said data stored in said memory comprise a programming of the action, said programming of the action associating each underwater element of said list that is going to operate inside said area of interest with a destination position; and said processing unit is configured to determine, based on said programming, the likelihood of the safety area of each underwater element present in said area of interest being at least partially invaded.

4. A monitoring system according to claim 1, wherein said processing unit is configured to control, based on said data and on the detection of said detection unit, the movements of each underwater element operating in said area of interest.

5. A monitoring system according to claim 1, wherein said detection unit comprises a sound-based localization unit.

6. A monitoring system according to claim 5, wherein:
    said localization unit comprises a receiver and transmitter unit, and a further receiver and transmitter unit for each underwater element that is going to operate inside said area of interest;
    each further receiver and transmitter unit is fixed to the relative underwater element and is configured to emit sound signals; and
    said receiver and transmitter unit is configured to receive the sound signals emitted by said further receiver and transmitter units present inside said area of interest and to determine, based on said sound signals, the position of each underwater element.

7. A monitoring system according to claim 6, wherein said processing unit is in communication with said receiver and transmitter unit and is configured to determine, based on said data and on what it receives from said receiver and transmitter unit, the orientation of each underwater element present inside said area of interest.

8. A monitoring system according to claim 1, comprising at least one network interface, which is configured to receive said representation of said area of interest and to transfer it to said memory.

9. A monitoring system according to claim 1, wherein said processing unit is configured to communicate with each underwater element.

10. A monitoring system according to claim 1, comprising a further user interface, which is placed in a remote location and is configured to display said representation of the area of interest.

11. A monitoring method to monitor the underwater traffic of an area of interest where at least one underwater element is going to operate; said monitoring method comprises:
    an acquisition step, during which data are acquired and stored, which comprise representation of said area of interest, which shows at least the static obstacles present inside said area of interest, and a list of a plurality of types of underwater elements, said list comprising a digital model for each one of said underwater elements;
    a detection step, during which the position and the orientation of each underwater element present inside said area of interest are detected;
    a processing step, during which, based on said data and on the detection carried out during said detection step, the type of each underwater element present inside the area of interest is identified and a representation of the area of interest is generated, which shows the static obstacles, and the digital model, the position and the orientation of each underwater element present inside said area of interest; and a displaying step, during which said representation of the area of interest is displayed in a user interface.

12. A monitoring method according to claim 11, wherein said detection step is at least partially simultaneous with said processing step.

13. A monitoring method according to claim 11, wherein: said digital model of said list associates each underwater element of said list with a safety area, which contains the underwater element and extends up to a defined distance from the respective underwater element;

said processing step entails, based on said data and on the detection carried out during said detection step, the generation of an alarm signal when a safety area of an underwater element present inside said area of interest is at least partially invaded.

14. A monitoring method according to claim 13, wherein: said data acquired and stored during said acquisition step comprise a programming of the action, said programming associating each underwater element that is going to operate inside said area of interest with a destination position;

said processing step entails, based on said data and on the detection carried out during said detection step, the determination of the likelihood of the safety area of each underwater element present in said area of interest being at least partially invaded.

15. A monitoring method according to claim 11, comprising a control step, during which each underwater element present in said area of interest is controlled, based on said data and on the detection carried out during said detection step.

* * * * *